(12) United States Patent
Chiang

(10) Patent No.: US 7,006,265 B2
(45) Date of Patent: Feb. 28, 2006

(54) TRANSMISSION DEVICE FOR NAME CARD SCANNER

(76) Inventor: Shu-Ya Chiang, No. 1-1, R&D Rd. 2, Science-Based Industrial Park, Hsinchu (TW)

( * ) Notice: Subject to any disclaimer, the term of this patent is extended or adjusted under 35 U.S.C. 154(b) by 977 days.

(21) Appl. No.: 10/053,057

(22) Filed: Nov. 10, 2001

(65) Prior Publication Data

US 2003/0090743 A1    May 15, 2003

(51) Int. Cl.
*H04N 1/04* (2006.01)

(52) U.S. Cl. .................. 358/497; 358/474; 358/494
(58) Field of Classification Search ........... 358/497, 358/494, 474, 471, 487, 506, 505; 250/234, 250/235, 236; 382/312, 318, 319; 399/211–213
See application file for complete search history.

(56) References Cited

U.S. PATENT DOCUMENTS

| | | | | |
|---|---|---|---|---|
| 4,857,956 A | * | 8/1989 | Honda | 399/210 |
| 5,663,812 A | * | 9/1997 | Pan | 358/474 |
| 5,818,611 A | * | 10/1998 | Shih | 358/474 |
| 5,923,445 A | * | 7/1999 | Leou | 358/474 |
| 6,005,684 A | * | 12/1999 | Tu et al. | 358/496 |
| 6,304,344 B1 | * | 10/2001 | Brandestini et al. | 358/487 |
| 6,600,578 B1 | * | 7/2003 | Huang | 358/474 |

\* cited by examiner

*Primary Examiner*—Cheukfan Lee
(74) *Attorney, Agent, or Firm*—Berkeley Law & Technology Group LLC

(57) ABSTRACT

A transmission device for driving a name card to pass over a contact image sensor (CIS) comprises: a loading deck provided with a central recess and a correction slip attached to a bottom face at the front end thereof; a first gear set for driving the loading deck; a second gear set fixed oppositely on the same gear shaft of the first gear set for driving the loading deck; and a motor for driving the first gear set.

17 Claims, 6 Drawing Sheets

TRANSMISSION DEVICE FOR NAME CARD SCANNER

FIELD OF THE INVENTION

This invention relates to a transmission device for name card scanner provide for driving a name card or the like to pass over a contact image sensor (CIS) for scanning and storing data thereof.

BACKGROUND OF THE INVENTION

A conventional name card scanner shown in FIG. 1 comprises a transmission mechanism and a contact image sensor (CIS) 16. In the transmission mechanism, a motor 10 drives a gear set 12 then a roller 14 to draw a name card over the CIS 16 by taking advantage of a frictional force for the purpose of scanning the name card.

Because of the considerable thickness of the roller 14, the name card scanner is somewhat awkward and bulky in modeling, therefore, this invention is brewed to remove the roller to minimize the volume of the scanner accordingly so as to improve the portability thereof.

SUMMARY OF THE INVENTION

The primary object of this invention is to provide a transmission device for name card scanner by removing a roller in a conventional scanner to minimize the thickness and volume thereof to improve its portability In order to realize abovesaid object, the transmission device for driving a name card to pass over a contact image sensor (CIS) comprises: a loading deck provided with a central recess and a correction slip attached to a bottom face at the front end thereof; a first gear set for driving the loading deck; a second gear set fixed oppositely on the same gear shaft of the first gear set for driving the loading deck; and a motor for driving the first gear set.

For more detailed information regarding advantages or features of this invention, at least an example of preferred embodiment will be elucidated below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

Figure 1:
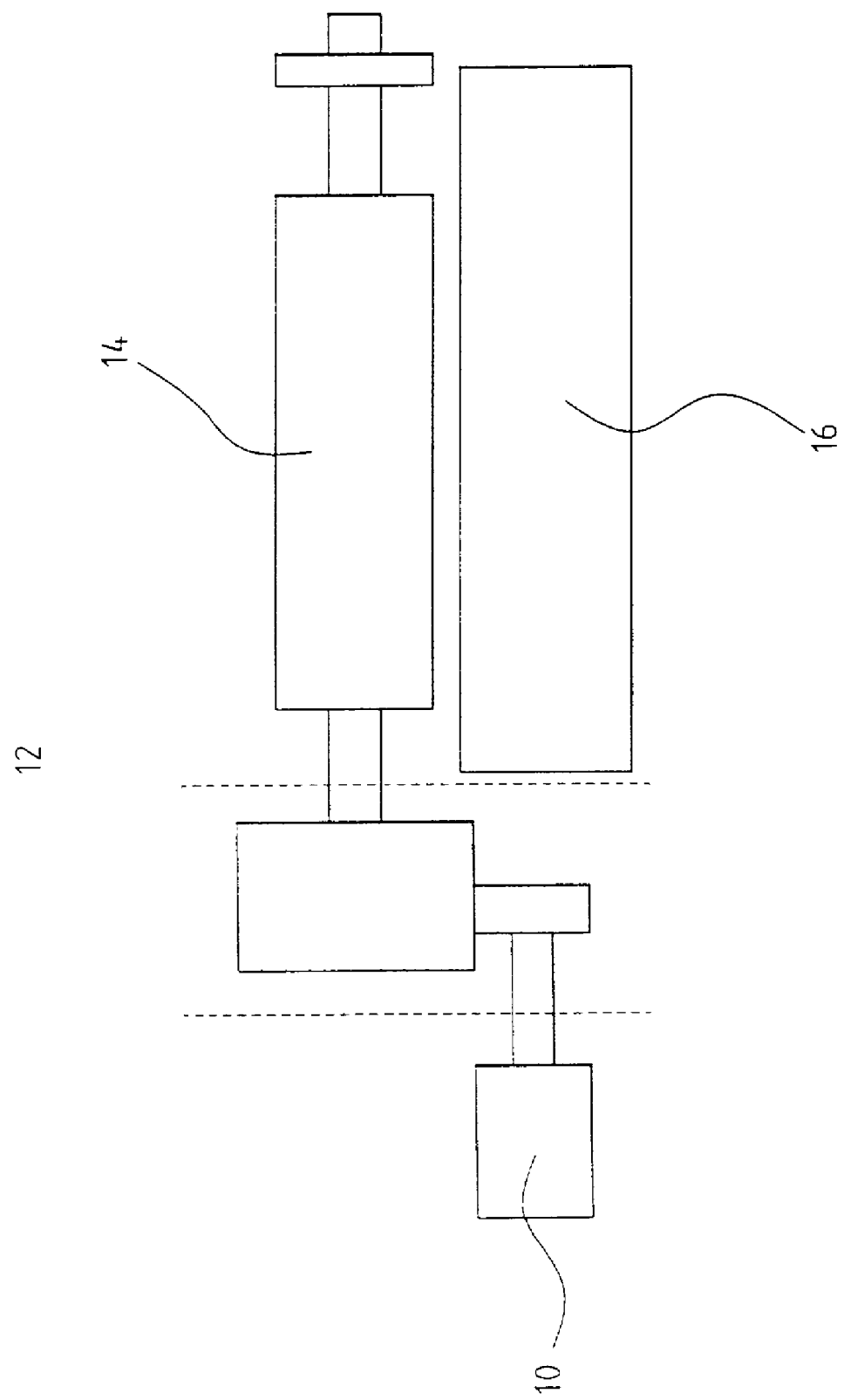
FIG. 1 shows a partial structure of a conventional name card scanner.
Figure 2A:
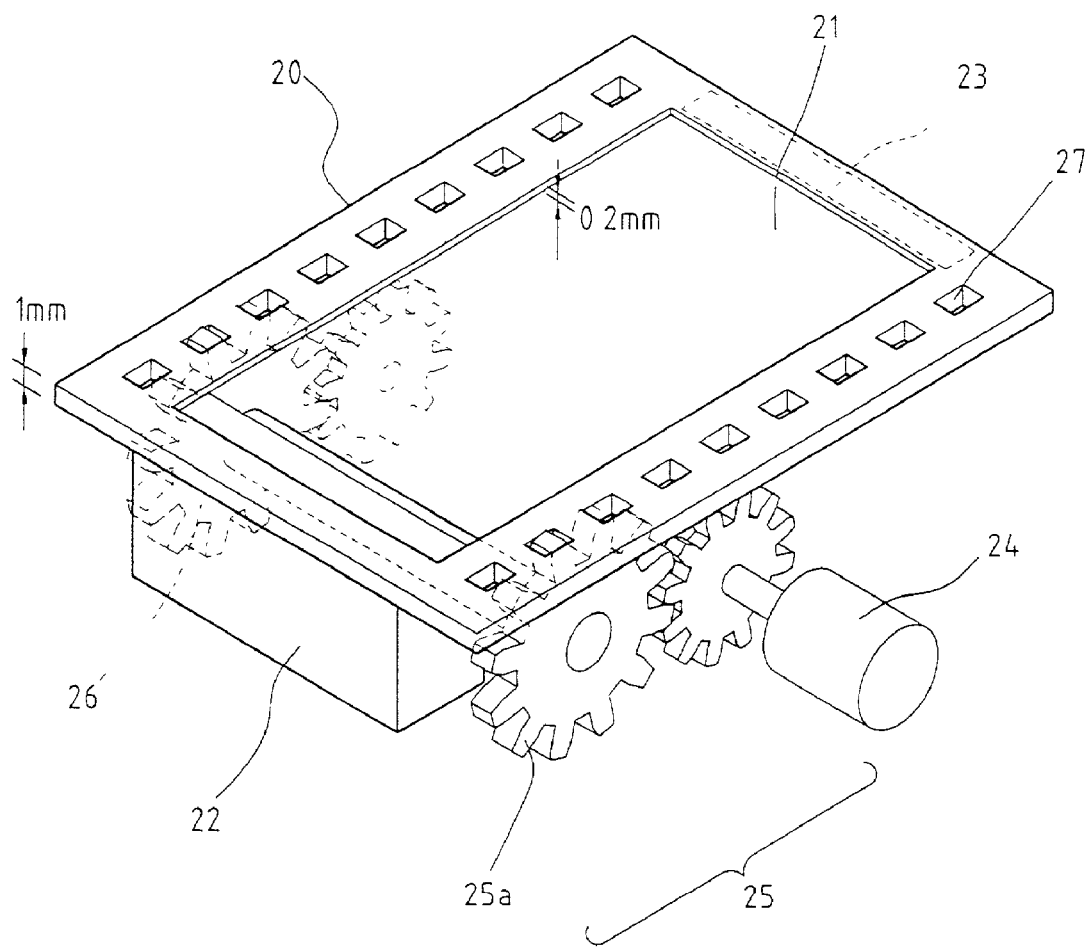
FIG. 2A is a schematic view of a first embodiment of this invention.
Figure 2B:
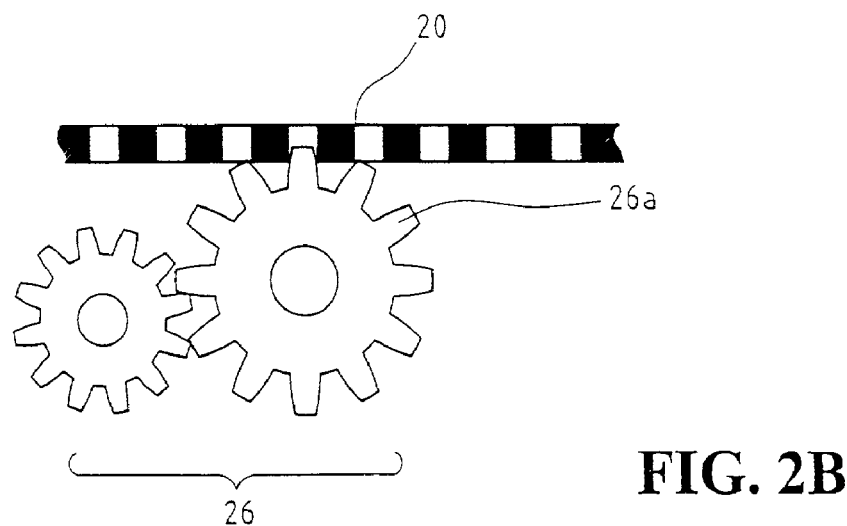
FIG. 2B is a lateral view of this invention shown in FIG. 2A.

As illustrated in an schematic view of a first embodiment of this invention shown in FIG. 2A and a lateral view thereof shown in FIG. 2B, a recess 21 for loading a name card is formed in a loading deck 20 centrally and an adhesive plastic film (not shown) is laid on the recess 21 for eliminating image distortion in the event of a folded name card. The loading deck 20 is about 1 mm thick while the recess 21 is about 0.2 mm deep such that a name card is permitted to be attached as closely as possible to a contact image sensor (CIS) 22 having a view depth of 1 mm only Moreover, the width of the CIS 22 is exactly the same with that of the recess 21, and a correction slip 23 is adhered to a bottom face of the front end of the loading deck 20.

A first gear set 25 and a paired second gear set 26 are set by a bracket (not shown), and a motor 24 is implemented to drive the first gear set 25, then the second gear set 26. The teeth 25a, 26a of the first and the second gear set 25, 26 are engaged with a plurality of slots 27 formed on both sides of the loading deck 20 respectively to thereby drive the loading deck 20 to pass over the CIS sensor 22 to have a name card scanned when the motor 24 drives the first and the second gear set 25, 26.

Figure 3A:
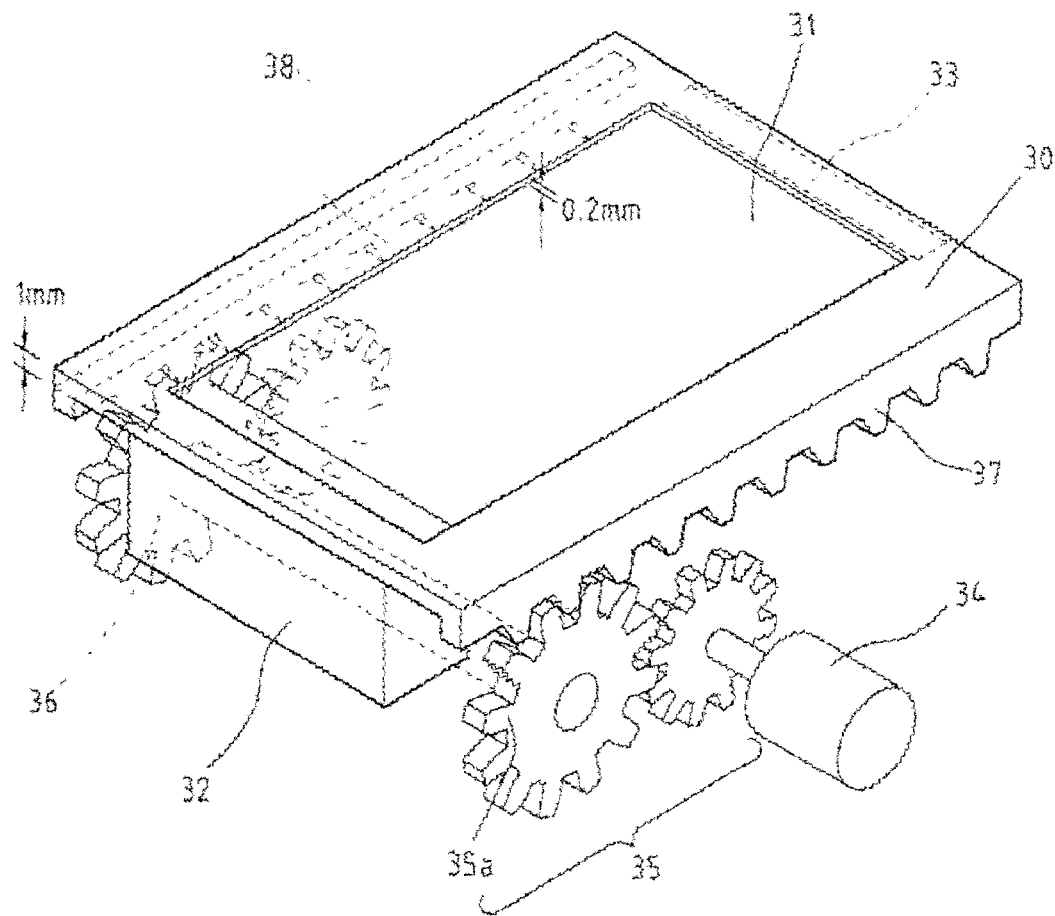
FIG. 3A is a schematic view of a second embodiment of this invention.
Figure 3B:
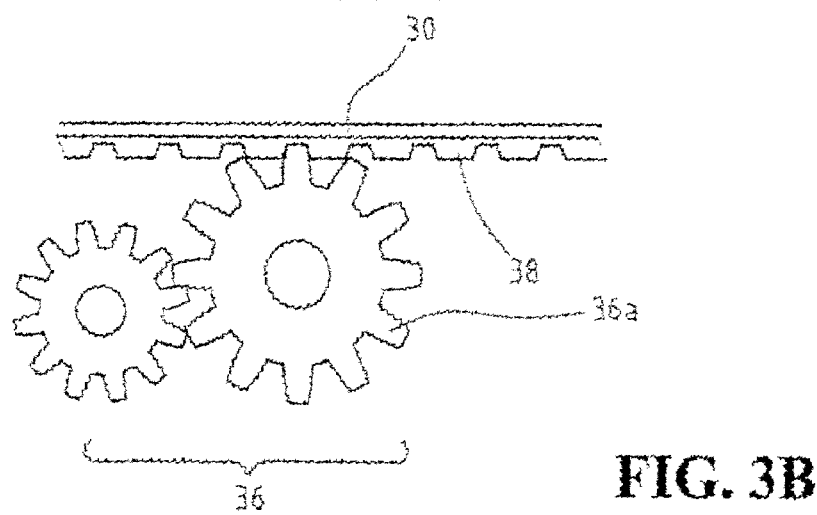
FIG. 3B is a lateral view of this invention shown in FIG. 3A.

In an schematic view of a second embodiment of this invention shown in FIG. 3A and a lateral view thereof shown in FIG. 3B, a recess 31 for loading a name card is formed in a loading deck 30 centrally and an adhesive plastic film (not shown) is laid on the recess 31 for eliminating image distortion in the case of a folded name card. The loading deck 30 is about 1 mm thick while the recess 31 is about 0.2 mm deep such that a name card is permitted to be attached as closely as possible to a contact image sensor (CIS) 32 having a view depth of 1 mm only. Moreover, the width of the CIS 32 is exactly the same with that of the recess 31, and a correction slip 33 is adhered to a bottom face of the front end of the loading deck 30.

A first gear set 35 and a paired second gear set 36 are set by a bracket (not shown), and a motor 34 is implemented to drive the first gear set 35, then the second gear set 36. The teeth 35a, 36a of the first and the second gear set 35, 36 are engaged with a gear bar 37, 38 formed under two opposite lateral sides of the loading deck 30 respectively, which, the loading deck 30 is thereby driven to pass over the CIS sensor 32 to have a name card scanned when the motor 34 drives the first and the second gear set 35, 36.

Figure 4:
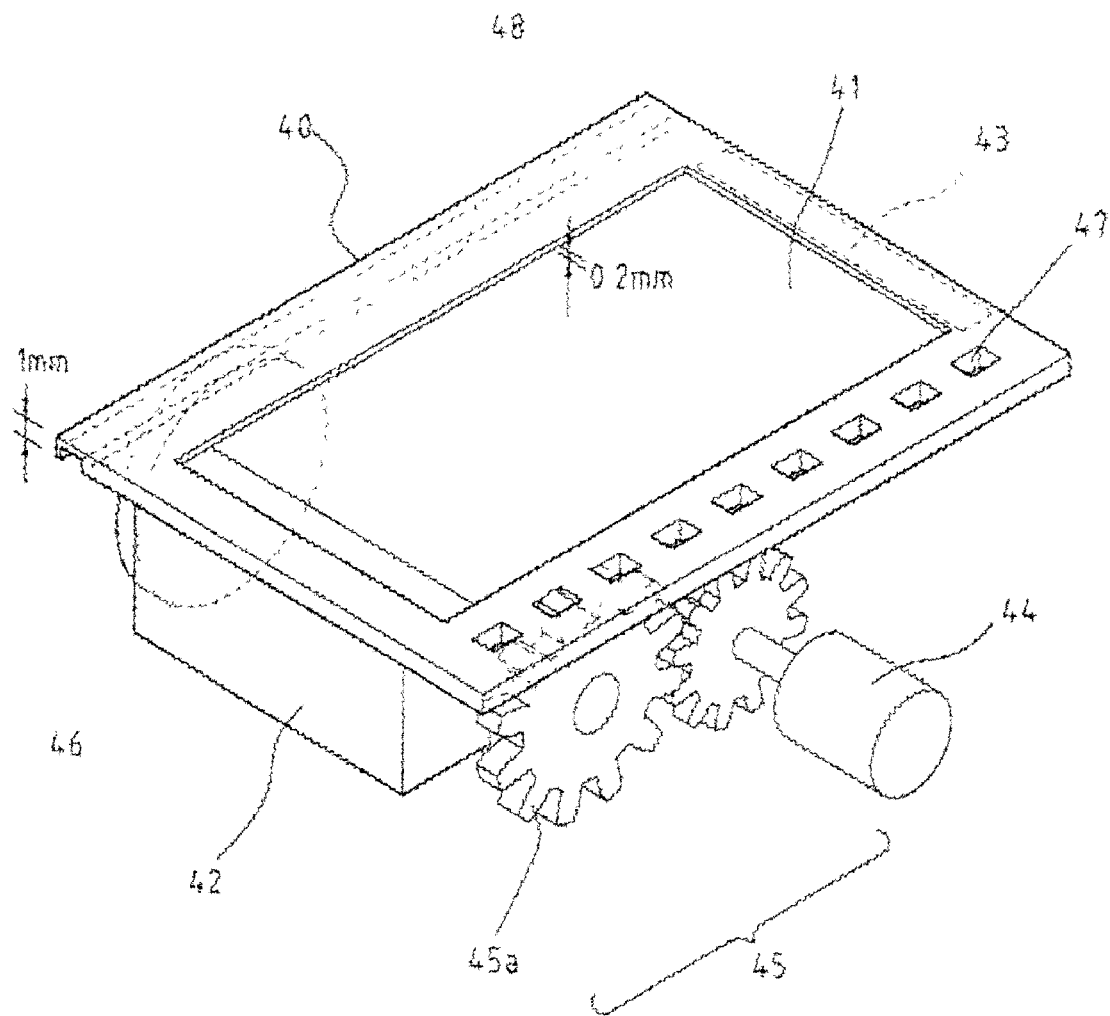
FIG. 4 is a schematic view of a third embodiment of this invention.

In an schematic view of a third embodiment of this invention shown in FIG. 4, a recess 41 for loading a name card is formed in a loading deck 40 centrally and an adhesive plastic film (not shown) is laid on the recess 41 for eliminating image distortion in the event of a folded name card. The loading deck 40 is about 1 mm thick while the recess 41 is about 0.2 mm deep such that a name card is permitted to be attached as closely as possible to a contact image sensor (CIS) 42 having a view depth of 1 mm only. Moreover, the width of the CIS 42 is exactly the same with that of the recess 41, and a correction slip 43 is adhered to a bottom face of the front end of the loading deck 40.

A first gear set 45 set by a bracket (not shown) is engaged by taking advantage of its teeth 45a with a plurality of slots 47 formed on one side of the loading deck 40. When a motor 44 drives the first gear set 45, the loading deck 40 is driven to pass over the CIS sensor 42 to have a name card scanned. A wheel 46 located on another side opposite to the slots 47 runs along a rail 48 opened downward for supporting the loading deck 40.

Figure 5:
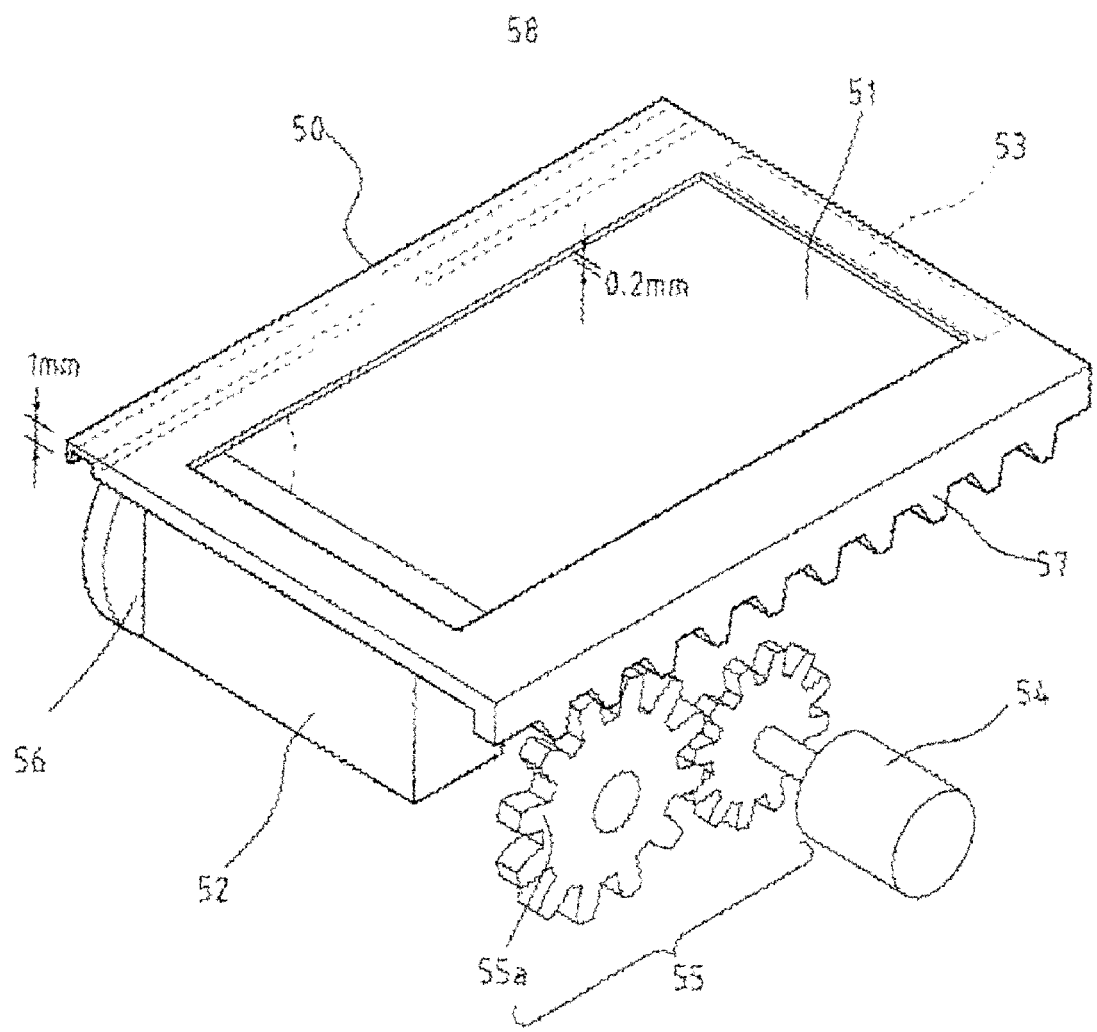
FIG. 5 is a schematic view of a fourth embodiment of this invention.

In an schematic view of a fourth embodiment of this invention shown in FIG. 5, a recess 51 for loading a name card is formed in a loading deck 50 centrally and an adhesive plastic film (not shown) is laid on the recess 51 for eliminating image distortion in the event of a folded name card. The loading deck 50 is about 1 mm thick while the recess 51 is about 0.2 mm deep such that a name card is permitted to be attached as closely as possible to a contact image sensor (CIS) 52 having a view depth of 1 mm only. Moreover, the width of the CIS 52 is exactly the same with that of the recess 51, and a correction slip 53 is adhered to a bottom face of the front end of the loading deck 50.

A first gear set 55 set by a bracket (not shown) is engaged by taking advantage of its teeth 55a with a gear bar 57 formed below one side of the loading deck 50. When a motor 54 drives the first gear set 55, the loading deck 50 is driven to pass over the CIS sensor 52 to have a name card scanned. A wheel 56 located on another side opposite to the gear bar 57 runs along a rail 58 opened downward for supporting the loading deck 50.

Figure 6:
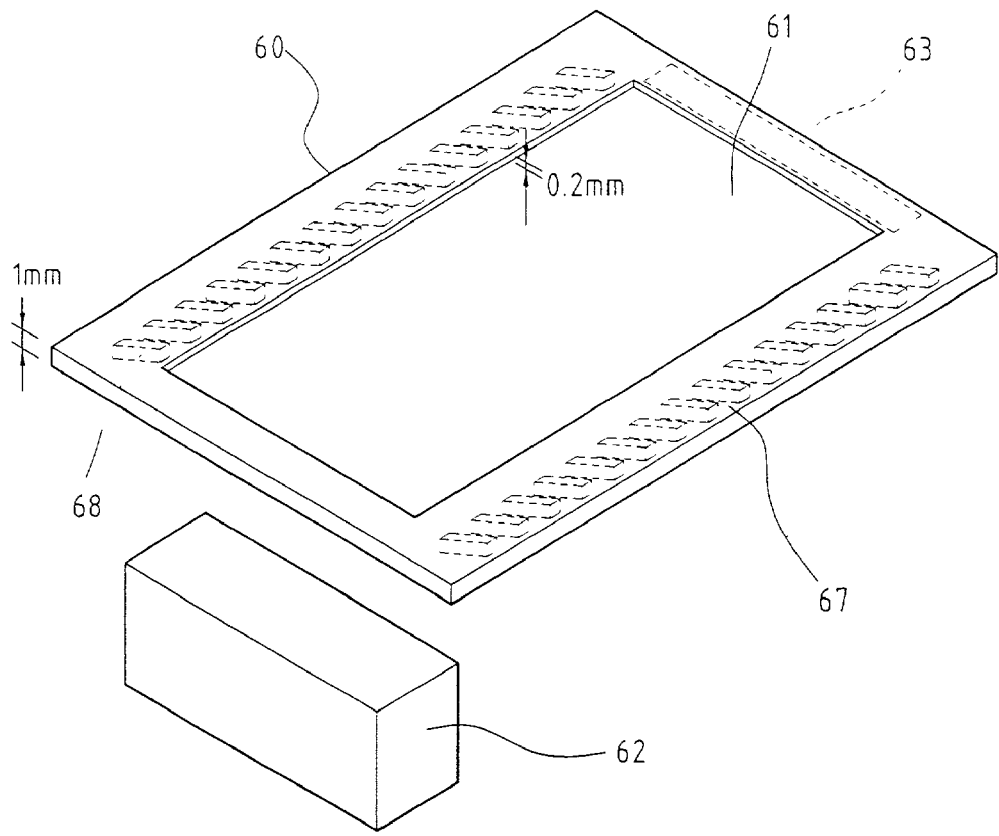
FIG. 6 is an exploded view of a fifth embodiment of this invention.
Figure 6:
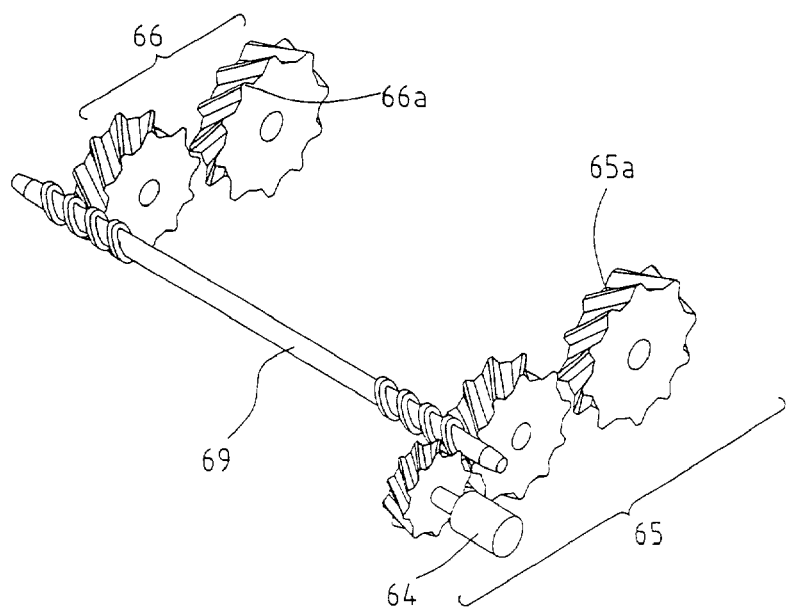

In FIG. 6—an exploded view of a fifth embodiment of this invention—a recess 61 for loading a name card is formed in a loading deck 60 centrally and an adhesive plastic film (not shown) is laid on the recess 61 for eliminating image distortion in the event of a folded name card. The loading deck 60 is about 1 mm thick while the recess 61 is about 0.2 mm deep such that a name card is permitted to be attached as closely as possible to a contact image sensor (CIS) 62 having a view depth of 1 mm only. Moreover, the width of the CIS 62 is exactly the same with that of the recess 61, and a correction slip 63 is adhered to a bottom face of the front end of the loading deck 60.

A first and a second bevel gear set 65, 66 are set by a bracket (not shown). A motor 64 is provided to drive the first and the second bevel gear set 65, 66 by taking advantage of a stud 69. The teeth 65a, 66a of respective bevel gear sets 65, 66 are engaged with a bevel gear bar 67, 68 positioned under each side of the loading deck 60 so that the motor 64 drives the first and the second bevel gear set 65, 66 to have the loading deck 60 driven to pass over the CIS 62 and have a name card scanned.

In the above described at least one preferred embodiment has been described in detail with reference to the drawings annexed, and it is apparent that numerous variations or modifications may be made without departing from the true spirit and scope thereof, as set forth in the claims below.

What is claimed is:

1. A transmission device for name card scanner, which is provided to drive a name card to pass over a contact image sensor (CIS) for scanning, comprising:
   a loading deck having: a central recess for loading a name card; and a correction slip attached to a bottom face at the front end thereof;
   a first gear set for driving the loading deck;
   a second gear set fixed oppositely on the same gear shaft of the first gear set for driving the loading deck; and
   a motor for driving the first gear set.

2. The transmission device according to claim 1, wherein the loading deck is about 1 mm thick.

3. The transmission device according to claim 1, wherein the recess is about 0.2 mm deep.

4. The transmission device according to claim 1, wherein an adhesive plastic film is laid on the recess for anchoring a name card.

5. The transmission device according to claim 1, wherein a plurality of slots is formed on both sides of the loading deck and engaged with the teeth of the first and the second gear set respectively.

6. The transmission device according to claim 1, wherein a gear bar is formed under two opposite lateral sides of the loading deck and engaged with the teeth of the first and the second gear set respectively.

7. A transmission device for name card scanner, which is provided to drive a name card to pass over a contact image sensor (CIS) for scanning, comprising:
   a loading deck having; a central recess for loading a name card; and a correction slip attached to a bottom face at the front end thereof;
   a first gear set for driving the loading deck;
   a wheel for supporting the loading deck; and
   a motor for driving the first gear set.

8. The transmission device according to claim 7, wherein the loading deck is about 1 mm thick.

9. The transmission device according to claim 7, wherein the recess is about 0.2 mm deep.

10. The transmission device according to claim 7, wherein an adhesive plastic film is laid on the recess for anchoring a name card.

11. The transmission device according to claim 7, wherein a plurality of slots is formed on one side of the loading deck and engaged with the teeth of the first gear set; and a rail is arranged on the other side under the loading deck for the wheel to move along.

12. The transmission device according to claim 7, wherein a gear bar is arranged under a lateral side of the loading deck and engaged with the teeth of the first gear set; and a rail is arranged on the other side under the loading deck for the wheel to move along.

13. A transmission device for name card scanner, which is provided to drive a name card to pass over a contact image sensor (CIS) for scanning, comprising:
   a loading deck having; a central recess for loading a name card;
   a bevel gear bar positioned under each side thereof; and a correction slip attached to a bottom face at the front end thereof;
   a stud being threaded at both ends;
   a first bevel gear set mounted on the stud for driving the loading deck;
   a second bevel gear set mounted on the stud for driving the loading deck; and
   a motor for driving the first bevel gear set.

14. The transmission device according to claim 13, wherein the loading deck is about 1 mm thick.

15. The transmission device according to claim 13, wherein the recess is about 0.2 mm deep.

16. The transmission device according to claim 13, wherein an adhesive plastic film is laid on the recess for anchoring a name card.

17. The transmission device according to claim 13, wherein two bevel gear bars are arranged under two sides of the loading deck and engaged with the teeth of the first and the second bevel gear set respectively.

* * * * *